Oct. 9, 1956     A. NAPOLILLO     2,765,755
CULINARY MOLD
Filed July 12, 1954
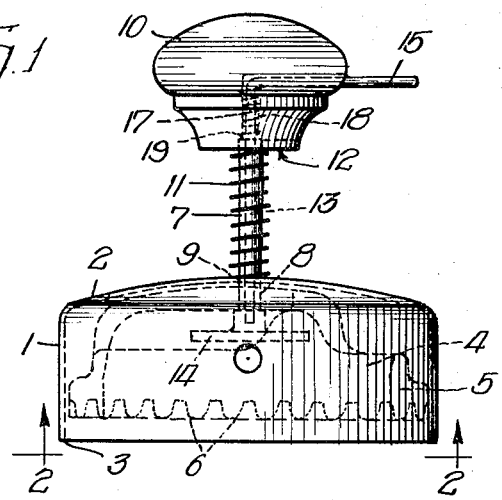
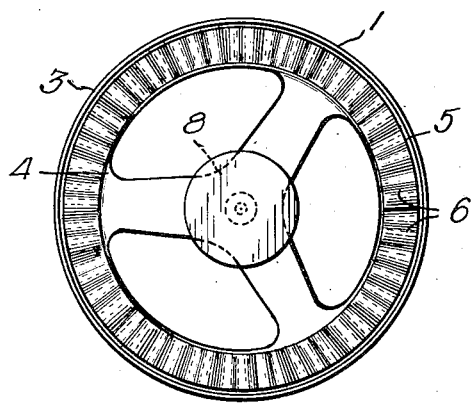
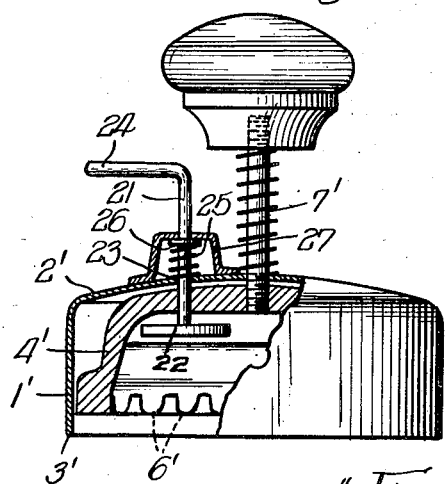
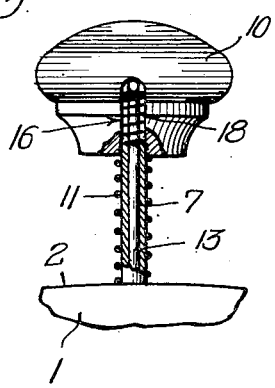
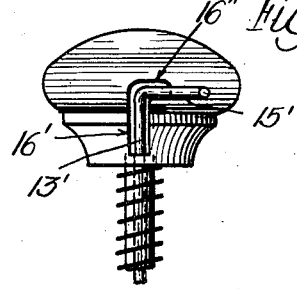
INVENTOR.
Angelo Napolillo,
BY
Brown, Jackson, Boettcher & Dienner
Attys.

United States Patent Office 2,765,755
Patented Oct. 9, 1956

2,765,755

CULINARY MOLD

Angelo Napolillo, Evergreen Park, Ill.

Application July 12, 1954, Serial No. 442,853

2 Claims. (Cl. 107—47)

This invention relates, in general, to a culinary mold, and more particularly to a culinary mold for cutting edibles such as ravioli, pies, cookie dough, biscuits and material of similar character to a desired configuration and for impressing a desired design on the molded article.

The present invention may be characterized as an improvement on the devices disclosed in my prior Letters Patent No. 2,106,057, granted January 18, 1938, for "Cooking Tools," and in my prior Design Patent No. 114,900, granted May 23, 1939, for "Culinary Mold."

One of the main objects of the present invention is to provide an improved mold comprising an outer body having a peripheral cutting edge; a mold member movable in said outer body and provided with a molding face having a configuration thereon to be imparted to the molded article; and ejector means for ejecting the cut and molded article from the outer body and the mold member.

Another object is to provide a mold of the character described wherein, by depression of a finger piece, the mold member is depressed into cooperation with the material and the cutting edge simultaneously depressed to cut the article to the desired peripheral outline, and wherein there is separately operable means for ejecting the cut and molded article from the outer body and the mold member.

Another object is to provide a mold of the character described wherein the ejector has a stem extending through a tubular stem for the mold member, and more particularly wherein the ejector stem has a laterally turned outer end for engagement by the hand of the operator and operable in a slot in a finger piece on the stem for the mold member.

Another object is to provide a mold of the character described wherein the ejector stem is spaced laterally from the axis of the stem for the mold member.

Another object is to provide a mold of the character described which will be portable and manually operable; also highly efficient in use and economical in manufacture.

Further objects and advantages of the invention will appear from the following detailed description taken in connection with the accompanying drawing, in which:

Figure 1 is a side elevational view of one form of culinary mold embodying the present invention;

Figure 2 is a bottom plan view of the mold taken substantially on the line 2—2 of Figure 1;

Figure 3 is a fragmentary elevational view, partially broken away and in section, looking at the handle or finger piece for the mold member at substantially right angles and from the right as the device is shown in Figure 1;

Figure 4 is a side elevational view, partially broken away and in section, of another form of mold embodying the present invention; and Figure 5 is a view similar to Figure 3 showing another modification.

Referring now to the drawing, the embodiment of the invention illustrated in Figures 1–3 comprises an outer cylindrical body 1 formed, for example, of relatively thin metal. This outer body 1 has an end wall 2 at one end and its opposite end is open and provided with a peripheral cutting edge 3.

A mold member 4 formed, for example, of light weight metal, such as aluminum or the like, has a cylindrical rim 5 which fits loosely for movement in the outer mold body 1. The ring 5 has a molding face presented toward the open end of the body 1 on which there is a configuration 6 in the form, for example, of radial scallop forming fingers for imparting a scalloped or other desired configuration to the molded article.

A first stem 7 of tubular form is fixedly attached at its inner end to the radially armed integral hub 8 of the body 1, for example, by threaded engagement therewith, and extends outwardly for rectilinear movement through an opening 9 in the end wall 2. A finger piece 10 mounted on the outer end of the stem 7 is effective when depressed to depress the mold member 4 into cooperation with the material to be molded to impress upon the molded article the scallops or other configuration on the molding face. A first coiled spring 11 interposed to act between the end wall 2 and an abutment 12 formed on the stem 7 by the inner end of the finger piece 10 is effective upon depression of the finger piece 10 to depress the cutting edge 3 into and through the material to cut the article to the desired peripheral outline. Upon release of the finger piece 10 the spring 11 is effective to move the mold member to a retracted position within the outer body 1 and to retain same in such retracted position.

A second stem 13 has an ejector disk 14 suitably fixed on its inner end and extends outwardly through the tubular stem 7. The stem 13 has a laterally turned outer end 15 for engagement by the hand of the operator, and which is operable in a slot 16 in the finger piece 10. The finger piece 10 is recessed at 17 to provide space for a second coiled spring 18 which surrounds the stem 13 and is interposed to act, for example, between the inner end of the laterally turned end 15 of the stem 13 and a shoulder 19 formed, for example, at the inner end of the recess 17. The spring 18 may, if desired, be sufficiently lighter or weaker than the spring 11 to permit depression of the stem 13 for ejecting the article without appreciably or substantially depressing the mold member 4.

If desired, the ejector spring 18 may be omitted and the ejector actuated manually to projected and retracted positions with means such as a lateral notch at the outer end of the slot 16 into which the lateral extension 15 of the stem 13 may be turned to retain the ejector stem 13 in retracted position.

In operation, the user places the mold in position with the cutting edge 3 directed downwardly upon the material from which the article is to be cut. The finger piece 10 is then depressed, thereby depressing the mold member 4 to impress upon the article the configuration on the molding face and simultaneously to depress the cutting edge 3 into and through the material to cut the article to the desired peripheral configuration. Upon completion of the molding and cutting of the article, the finger piece 10 is released and the first spring 11 moves the mold member 4 to retracted position within the outer body 1 and retains same in such position.

Then by depressing the second finger piece 15 the ejector disk 14 is depressed and ejects the molded and cut article from the outer body 1 and the mold member 4.

The lateral notch 16" at the outer end of the slot 16' as shown in Figure 5, which corresponds to the slot 16 of Figure 3, acts to hold the stem 13' which corresponds to the stem 13 of Figure 3 in retracted position where the spring 18 of Figure 3 is omitted and the ejector is manually retracted. The laterally directed outer end 15' of the stem 13' is merely turned into and out of the lateral notch 16" to hold the ejector in released position and to release the same.

The mold shown in Figure 4 in similar to the mold shown in Figure 3, except that the second stem 21 with its ejector disk 22 are spaced laterally from the stem 7' which may be of solid form since the stem 21 does not extend therethrough. The stem 21 extends outwardly for rectilinear movement through a second opening 23 in the end wall 2', and has a laterally turned portion 24 forming a finger piece for manually depressing the stem 21 and ejector disk 22 to eject the article from the outer body 1' and mold member 4'. A second spring 25 interposed to act between the end wall 2' and a pin or abutment 26 on the stem 21 is effective when the ejector stem 21 is released to move the ejector to retracted position and maintain same in said position. The spring 25 is confined in an inverted generally U-shaped bracket 27 attached to the end wall 2'. The stem 21 has rectilinear movement through an opening in the outer wall of the bracket 27.

The embodiments of the invention shown in the drawing are for illustrative purposes only, and it is to be expressly understood that said drawing and accompanying specification are not to be construed as a definition of the limits or scope of the invention, reference being had to the appended claims for that purpose.

I claim:

1. A culinary mold for cutting and molding articles from suitable material comprising, in combination, an outer body having an end wall at one end and open at its opposite end with a peripheral cutting edge at said open end, a mold member having movement in said outer body and provided with a molding face having a configuration thereon to be imparted to the molded article, a first stem attached at its inner end to said mold member and extending outwardly for rectilinear movement through an opening in said end wall, a finger piece having a recess therein on said first stem and effective when depressed to depress said mold member into cooperation with the material to impress upon the article the configuration on said molding face, a first spring embracing said first stem and interposed between said end wall and an abutment on the outer end of said first stem, said spring being effective upon depression of said finger piece to depress said cutting edge into and through the material to cut the article to the desired peripheral outline and effective upon release of said finger piece to move said mold member to retracted position within said outer body, a second stem extending outwardly through said first stem and having at its inner end an ejector and extending outwardly for rectilinear movement through said end wall, and a second spring positioned in the recess in said finger piece and effective when said second stem is released to maintain said ejector in retracted position within said mold member, said second stem being effective when depressed to depress said ejector to eject the cut and molded article from said outer body and said mold member.

2. A culinary mold according to claim 1 wherein said first stem is of tubular form and said second stem extends outwardly through said tubular first stem and has a laterally turned outer end for engagement by the hand of the operator and operable in a slot in the finger piece on said first stem.

References Cited in the file of this patent

UNITED STATES PATENTS

| 808,015 | Coppins | Dec. 19, 1905 |
| 2,137,811 | Royal | Nov. 22, 1938 |
| 2,314,401 | Johnson | Mar. 23, 1943 |

FOREIGN PATENTS

| 825,442 | France | Mar. 3, 1938 |